US012590199B2

(12) United States Patent
Kim et al.

(10) Patent No.: US 12,590,199 B2
(45) Date of Patent: Mar. 31, 2026

(54) ANTISTATIC RESIN COMPOSITION, MOLDED ARTICLE THEREOF, AND METHOD OF MANUFACTURING THE SAME

(71) Applicant: DAEJIN ADVANCED MATERIALS INC., Gyeonggi-do (KR)

(72) Inventors: Gwan Yeong Kim, Gyeonggi-do (KR); Kyu Hyun Kang, Gyeonggi-do (KR); Hye Won Jang, Gyeonggi-do (KR); Sung-Bin Park, Seoul (KR); In Jeong Cho, Seoul (KR); Yoon-Jae Baek, Seoul (KR); Sora Sim, Seoul (KR)

(73) Assignee: DAEJIN ADVANCED MATERIALS INC., Gyeonggi-do (KR)

( * ) Notice: Subject to any disclaimer, the term of this patent is extended or adjusted under 35 U.S.C. 154(b) by 990 days.

(21) Appl. No.: 17/760,798

(22) PCT Filed: Oct. 22, 2021

(86) PCT No.: PCT/KR2021/014957
§ 371 (c)(1),
(2) Date: Mar. 16, 2022

(87) PCT Pub. No.: WO2023/286924
PCT Pub. Date: Jan. 19, 2023

(65) Prior Publication Data
US 2024/0043652 A1 Feb. 8, 2024

(30) Foreign Application Priority Data
Jul. 13, 2021 (KR) ........................ 10-2021-0091600

(51) Int. Cl.
*C08K 3/04* (2006.01)
*C08L 55/02* (2006.01)

(52) U.S. Cl.
CPC .............. *C08K 3/041* (2017.05); *C08L 55/02* (2013.01); *C08K 2201/001* (2013.01)

(58) Field of Classification Search
CPC .... C08K 3/041; C08K 9/08; C08K 2201/001; C08L 55/02; C08F 279/00; C08F 279/02; C08F 279/04; C08F 291/00; C08F 291/02
See application file for complete search history.

(56) References Cited

U.S. PATENT DOCUMENTS

| | | | | | |
|---|---|---|---|---|---|
| 3,168,593 | A | * | 2/1965 | Fremon ................. | C08F 279/04 |
| | | | | | 525/316 |
| 4,652,615 | A | * | 3/1987 | Hoen ....................... | C08L 55/02 |
| | | | | | 525/76 |
| 2006/0084760 | A1 | * | 4/2006 | Rego ..................... | C08F 279/04 |
| | | | | | 525/71 |
| 2006/0089434 | A1 | * | 4/2006 | Nodera .................. | C08K 5/523 |
| | | | | | 524/115 |
| 2010/0078194 | A1 | * | 4/2010 | Bhatt ..................... | C08K 3/041 |
| | | | | | 977/932 |

FOREIGN PATENT DOCUMENTS

| | | | | |
|---|---|---|---|---|
| KR | 10-2012-0095530 A | 8/2012 | | |
| KR | 10-2014-0141208 A | 12/2014 | | |
| KR | 10-2017-0122306 A | 11/2017 | | |
| WO | WO-2018176067 A2 * | 9/2018 | ............. | C03C 25/40 |

OTHER PUBLICATIONS

Office Action from corresponding Korean Patent Application No. 10-2021-0091600, dated Dec. 13, 2021.

* cited by examiner

*Primary Examiner* — Christopher M Rodd
(74) *Attorney, Agent, or Firm* — Harness, Dickey & Pierce, P.L.C.

(57) ABSTRACT
Provided is an antistatic resin composition including: a thermoplastic resin; and a conductive filler including carbon nanotubes, wherein the conductive filler is included in an amount of 1 wt % to 20 wt % based on the total weight of the composition. A molded article manufactured using the composition of the present invention has advantages in that tensile strength, impact resistance, and surface resistance are improved.

14 Claims, No Drawings

ANTISTATIC RESIN COMPOSITION, MOLDED ARTICLE THEREOF, AND METHOD OF MANUFACTURING THE SAME

CROSS-REFERENCE TO RELATED APPLICATIONS

This application is a National Phase application of PCT Application No. PCT/KR2021/014957 filed on Oct. 22, 2021 which claims priority to Korean Patent Application No. 10-2021-0091600 filed on Jul. 13, 2021. The entire disclosures of the applications identified in this paragraph are incorporated herein by reference.

TECHNICAL FIELD

The present invention relates to an antistatic resin composition.

BACKGROUND ART

Electrification or static electricity is a phenomenon in which an object takes on electrical properties when the balance of electric charges is broken, and is caused by physical motions and states between two objects, such as contact, separation, friction, and flow. An antistatic function refers to preventing the generation of static electricity by increasing the electrical conductivity of an object.

Today, with the development of the electronics industry, such as semiconductors, mobile phones, displays, and secondary batteries, it is necessary to solve malfunction issues caused by the static electricity problem of highly integrated electronic circuits and related key components, and contamination and defect problems caused by harmful substances such as dust. In addition, as the need for static electricity removal and pollution source control is particularly emphasized, research for developing an antistatic functional material having electrical conductivity in addition to existing properties is being actively conducted.

An antistatic function is generally provided by applying a coating using a conductive polymer coating agent or by adding a chemical additive such as a hydrophilic surfactant or a conductive material such as carbon black or a nanometal. In particular, PEDOT:PSS, which is a mainly used conductive polymer, easily forms a coating, but the material is vulnerable to heat and ultraviolet rays, so there is a disadvantage that the antistatic function is significantly reduced in a short period of one week, or six months at the most.

Conventionally, conductive fillers, surfactants, metal powders, metal fibers, and the like have been added to impart electrical conductivity. However, when a conductive filler is added to a polymer resin for manufacturing an antistatic composite material, a decrease in mechanical properties such as tensile strength, flexural strength, and impact strength may occur. Therefore, it is necessary to develop a material with improved mechanical properties and secured electrical properties.

SUMMARY

Technical Problem

The present invention is directed to providing an antistatic resin composition with improved mechanical and electrical properties, a molded article thereof, and a method of manufacturing the same.

Technical Solution

One aspect of the present invention provides an antistatic resin composition including: a thermoplastic resin including a vinyl cyanide compound-conjugated diene compound-aromatic vinyl compound graft copolymer; and a conductive filler including carbon nanotubes, wherein the conductive filler is added in an amount of 1 wt % to 20 wt % based on the total weight of the composition.

According to one embodiment of the present invention, the vinyl cyanide compound-conjugated diene compound-aromatic vinyl compound graft copolymer may have a weight-average molecular weight (Mw) of 120,000 g/mol to 150,000 g/mol.

According to one embodiment of the present invention, the vinyl cyanide compound-conjugated diene compound-aromatic vinyl compound graft copolymer may have a polydispersity index (PDI) of 1 to 3.

According to one embodiment of the present invention, the vinyl cyanide compound-conjugated diene compound-aromatic vinyl compound graft copolymer may include components (A) vinyl cyanide compound, (B) conjugated diene compound, and (C) aromatic vinyl compound having the following weight-average molecular weights (Mw).

Component (A): Mw=45,000 g/mol to 55,000 g/mol
Component (B): Mw=50,000 g/mol to 60,000 g/mol
Component (C): Mw=25,000 g/mol to 35,000 g/mol According to one embodiment of the present invention, the vinyl cyanide compound-conjugated diene compound-aromatic vinyl compound graft copolymer may include 9 wt % to 44 wt % of component (A), 17 wt % to 79 wt % of component (B), and 9 wt % to 44 wt % of component (C), and the content ratio of the sum of components (A) and (C) and component (B) (i.e., sum of components (A) and (C): component (B)) may be in the range of 4:1 to 1:4.

According to one embodiment of the present invention, the vinyl cyanide compound-conjugated diene compound-aromatic vinyl compound graft copolymer may include 15 wt % to 34 wt % of component (A), 33 wt % to 69 wt % of component (B), and 15 wt % to 34 wt % of component (C), and the content ratio of the sum of components (A) and (C) and component (B) (i.e., sum of components (A) and (C): component (B)) may be in the range of 2:1 to 1:2.

According to one embodiment of the present invention, the conductive filler may additionally include one or more of a carbon filler and carbon black, and the content ratio of the above-described carbon nanotubes and the one or more of a carbon filler and carbon black (i.e., carbon nanotubes:one or more of carbon filler and carbon black) may be in the range of 3:10 to 3:17 by weight.

According to one embodiment of the present invention, the surface of the carbon nanotubes may be treated with sizing thermoplastic polyurethane.

According to one embodiment of the present invention, the melt flow index (MI) of the thermoplastic resin may be in the range of 10 g/10 min to 50 g/10 min.

According to one embodiment of the present invention, the carbon nanotubes are single-walled carbon nanotubes, multi-walled carbon nanotubes, or a combination thereof, and the content ratio of single-walled carbon nanotubes and multi-walled carbon nanotubes may be in the range of 1:99 to 50:50.

According to one embodiment of the present invention, the thermoplastic resin may additionally include one or a combination thereof selected from the group consisting of polyester, polystyrene, polypropylene, polyimide, polyamide, polysulfonate, polycarbonate, polyacrylate, polyvinyl acetal, polymethylmethacrylate, polyvinyl chloride, polyethylene, modified polyphenylene oxide, SBS, SAN, synthetic rubber, a phenolic resin, an epoxy resin, an acrylic resin, and a blend or copolymer thereof.

According to one embodiment of the present invention, the composition may additionally include one or more additives selected from the group consisting of a compatibilizer, a UV stabilizer, an antioxidant, a lubricant, a heat stabilizer, a rubber, an antibacterial agent, a release agent, a dye, an inorganic additive, a surfactant, a nucleating agent, a coupling agent, a filler, a plasticizer, an impact modifier, an admixture, a colorant, a stabilizer, an antistatic agent, a pigment, and a flame retardant copolymer.

According to one embodiment of the present invention, the surface resistance of a specimen prepared by molding the antistatic resin composition may be in the range of $10^2$ ohm/sq to $10^4$ ohm/sq.

According to one embodiment of the present invention, the impact strength of a specimen prepared by molding the antistatic resin composition may be in the range of 50 J/m to 100 J/m.

Another aspect of the present invention provides an antistatic molded article manufactured and obtained by subjecting the antistatic resin composition to an extrusion process, an injection process, or a combination thereof.

According to one embodiment of the present invention, the molded article may be a battery component, an electronic component transfer cart, an electronic component packaging material, or an electronic component transfer tray.

Still another aspect of the present invention includes a method of manufacturing an antistatic molded article, which includes: preparing an antistatic resin composition; and manufacturing an antistatic molded article by subjecting the antistatic resin composition to extrusion, injection, or a combination thereof.

Advantageous Effects

An antistatic resin composition of the present invention has advantages in that since the content ratio of ABS resin components is adjusted, the composition has excellent electrical properties and improved mechanical properties compared to general thermoplastic resins including conductive fillers such as carbon black (CB) or carbon fiber (CF).

The antistatic resin composition of the present invention has advantages in that although the composition includes a small amount of conductive fillers compared to general antistatic compositions including a combination of a conductive filler and a thermoplastic resin, the desired antistatic performance of $10^2$ ohm/sq to $10^4$ ohm/sq is attained.

The antistatic resin composition of the present invention has advantages in that since impact strength and tensile strength, as well as electrical properties, are maintained, the composition can be used for manufacturing molded articles such as battery components, electronic parts and modules without limitation in the form and size thereof.

DETAILED DESCRIPTION

Hereinafter, the present invention will be described in more detail.

The following description of specific functions is merely illustrative and intended to describe embodiments according to the concept of the present invention, and embodiments according to the concept of the present invention may be implemented in various forms and should not be construed as being limited to the embodiments described herein.

Since the embodiments according to the concept of the present invention may have various modifications and various forms, only specific embodiments will be described in detail herein. However, this is not intended to limit the embodiments according to the concept of the present invention to the specific disclosed forms, and it should be understood that the embodiments according to the concept of the present invention include all modifications, equivalents, and substitutes included in the spirit and scope of the present invention.

Terms used herein are used only to describe specific embodiments and are not intended to limit the present invention. Singular expressions include plural expressions unless the context clearly dictates otherwise.

Unless defined otherwise, all terms used herein, including technical or scientific terms, have the same meaning as commonly understood by one of ordinary skill in the art to which the present invention pertains. Terms such as those defined in commonly used dictionaries should be interpreted as having a meaning consistent with the meaning in the context of the related art and should not be interpreted in an ideal or excessively formal sense unless explicitly defined in the present invention.

Hereinafter, exemplary embodiments of an antistatic resin composition with improved mechanical and electrical properties according to the present invention, a molded article thereof, and a method of manufacturing the same will be described in detail.

The term "composition" used herein may be used interchangeably with "composite material," "composite," or "mixture" in this specification, and it may be understood that the composition is formed of a combination of two or more materials.

In addition, terms such as "molded product" and "molded article" may be used interchangeably with "processed article" herein, and the molded product or molded article may be understood as a product molded into a form suitable for a purpose through the application of heat or pressure.

The present invention relates to an antistatic resin composition including: a thermoplastic resin; and a conductive filler. In particular, aspects of the present invention provide: an antistatic resin composition with improved tensile strength and impact resistance prepared by adjusting the content ratio of each component inside ABS so that mechanical properties can be secured within an allowable range even though a conductive filler is added to a thermoplastic polymer resin; and a molded article thereof.

Thermoplastic Resin

In an antistatic resin composition according to one embodiment of the present invention, any type of thermoplastic resin can be used without particular limitation as long as it has thermoplasticity. Specifically, as the thermoplastic resin, one or a combination thereof selected from the group consisting of polyester, polystyrene, polypropylene, polyimide, polyamide, polysulfonate, polycarbonate, polyacrylate, polyvinyl acetal, polymethylmethacrylate, polyvinyl chloride, polyethylene, modified polyphenylene oxide, ABS, SBS, SAN, synthetic rubber, a phenolic resin, an epoxy resin, an acrylic resin, and a blend or copolymer thereof, can be used.

Among these, more specifically, the thermoplastic resin may be a vinyl cyanide compound-conjugated diene compound-aromatic vinyl compound graft copolymer. The vinyl cyanide compound may be, for example, acrylonitrile, methacrylonitrile, or a combination thereof. The conjugated diene compound may be, for example, one or more selected from the group consisting of 1,3-butadiene, 2,3-dimethyl-1,3- butadiene, 2-ethyl-1,3-butadiene, 1,3-pentadiene, isoprene, chloroprene, and piperylene. The aromatic vinyl compound may be, for example, one or more selected from the group consisting of styrene, α-methyl styrene, vinyltoluene, and chlorostyrene.

Among components forming the vinyl cyanide compound-conjugated diene compound-aromatic vinyl compound graft copolymer, the vinyl cyanide compound, particularly acrylonitrile, is a component that may have an effect of improving mechanical properties such as hardness, tensile strength, elastic modulus, and impact resistance, the conjugated diene compound, particularly, butadiene, is a component that may have an effect of improving impact resistance, abrasion resistance, and the like, and the aromatic vinyl compound, particularly, styrene, is a component that may affect moldability, electrical properties, and the like.

In particular, among the vinyl cyanide compound-conjugated diene compound-aromatic vinyl compound graft copolymers, an ABS resin is a butadiene resin grafted with styrene and acrylonitrile, and by adjusting the proportion of styrene and acrylonitrile (SAN=styrene+acrylonitrile) and the proportion of butadiene, it is possible to improve mechanical properties such as the impact strength, elastic modulus, and tensile strength of the ABS resin and electrical properties such as surface resistance.

The vinyl cyanide compound-conjugated diene compound-aromatic vinyl compound graft copolymer may have a weight-average molecular weight (Mw) of 70,000 g/mol to 250,000 g/mol, specifically, 100,000 g/mol to 200,000 g/mol, and more specifically, 120,000 g/mol to 150,000 g/mol, and when this range is satisfied, mechanical properties are excellent.

The vinyl cyanide compound-conjugated diene compound-aromatic vinyl compound graft copolymer may have a polydispersity index (PDI) of 1 to 3, specifically, 1 to 2.5, more specifically, 1.5 to 1.82, and when this range is satisfied, mechanical properties are excellent.

The vinyl cyanide compound-conjugated diene compound-aromatic vinyl compound graft copolymer may include components (A) vinyl cyanide compound, (B) conjugated diene compound, and (C) aromatic vinyl compound, and the weight-average molecular weights (Mw) of the components are as follows.

Component (A): Mw=45,000 g/mol to 55,000 g/mol,
Component (B): Mw=50,000 g/mol to 60,000 g/mol,
Component (C): Mw=25,000 g/mol to 35,000 g/mol.

According to one embodiment of the present invention, concerning the content ratio of components forming the vinyl cyanide compound-conjugated diene compound-aromatic vinyl compound graft copolymer, as the proportion of the vinyl cyanide compound and the aromatic vinyl compound increases, tensile strength is improved, and as the proportion of the conjugated diene compound increases, impact strength is improved. In addition, there is a tendency that as the proportion of the conjugated diene compound increases, a melt flow index (MI) value decreases.

As one example of the vinyl cyanide compound-conjugated diene compound-aromatic vinyl compound graft copolymer, in the case of an ABS resin, mechanical properties and processability can be improved by adjusting, among various factors affecting impact strength, the proportion of SAN (acrylonitrile+styrene) and the proportion of butadiene in consideration of factors due to an adhesive effect between SAN (acrylonitrile+styrene) regions and Butadiene.

The vinyl cyanide compound-conjugated diene compound-aromatic vinyl compound graft copolymer may include 9 wt % to 44 wt % of component (A), 17 wt % to 79 wt % of component (B), and 9 wt % to 44 wt % of component (C). The content ratio of the sum of components (A) and (C) and component (B) (i.e., sum of components (A) and (C):component (B)) may be in the range of 4:1 to 1:4.

Specifically, the vinyl cyanide compound-conjugated diene compound-aromatic vinyl compound graft copolymer may include 15 wt % to 34 wt % of component (A), 33 wt % to 69 wt % of component (B), and 15 wt % to 34 wt % of component (C), and the content ratio of the sum of components (A) and (C) and component (B) may be in the range of 2:1 to 1:2.

According to one embodiment of the present invention, the content of component (B) may be 17 wt % or more, specifically, 35 wt % or more, and more specifically, 45 wt % or more, and 79 wt % or less, specifically, 69 wt % or less, and more specifically, 55 wt % or less.

Here, the wt % is obtained based on 100 wt % of the total weight of the conjugated diene rubber, the vinyl cyanide compound, and the aromatic vinyl compound.

According to one embodiment of the present invention, the thermoplastic resin may include the vinyl cyanide compound-conjugated diene compound-aromatic vinyl compound graft copolymer and another polymer resin or may be a blend thereof.

As the other polymer resin, any type of polymer resin can be used without particular limitation as long as it has thermoplasticity. Specifically, as the thermoplastic resin, one or a combination thereof selected from the group consisting of polyester, polystyrene, polypropylene, polyimide, polyamide, polysulfonate, polycarbonate, polyacrylate, polyvinyl acetal, polymethylmethacrylate, polyvinyl chloride, polyethylene, modified polyphenylene oxide, SBS, SAN, synthetic rubber, a phenolic resin, an epoxy resin, an acrylic resin, and a blend or copolymer thereof, can be used.

Among these, more specifically, the other polymer resin may be polypropylene (PP), polycarbonate (PC), or a combination thereof.

A melt flow index (MI) is a flow rate when a thermoplastic polymer melt is extruded from a piston under specific conditions and indicates how easily the melt flows. That is, the melt flow index can be used for understanding the flowability of polymer materials. In general, the higher the molecular weight, the lower the MI. When the MI is high, injection moldability is excellent, and when the MI is low, it is advantageous for extrusion. When the MI of the thermoplastic resin of the present invention is in the range of 1.5 g/10 min to 60 g/10 min, there is an advantage that the resin can be appropriately used for both injection molding and extrusion.

The melt flow index (MI) of the thermoplastic resin of the present invention may be specifically 10 g/10 min to 60 g/10 min, more specifically, 20 g/10 min to 50 g/10 min, and even more specifically, 22 g/10 min to 45 g/10 min.

Conductive Filler

A conductive filler according to one embodiment of the present invention may include carbon nanotubes. The conductive filler may include carbon nanotubes (CNTs), and the conductive filler may be included in an amount of 1 wt % to 40 wt % based on the total weight of the composition.

The carbon nanotube can improve the impact strength and tensile strength of the thermoplastic resin and, at the same time, improve the conductivity of a thermally conductive resin. In general, carbon nanotubes are tubular materials formed of carbons connected in a hexagonal ring shape and have a diameter of several to several tens of nanometers. Carbon nanotubes are not damaged or abraded even when continuously or repeatedly used, are chemically stable, and have excellent thermal and electrical properties, so they have various applications, such as electromagnetic absorbers, antistatic agents, field emission devices, semiconductor devices, gas sensors and biosensors, fuel cells, and reinforcement agents.

The carbon nanotube according to one embodiment of the present invention is a material for imparting electrical conductivity to the thermoplastic polymer resin having low electrical conductivity, and in a product manufactured by molding a resin composition to which it is added, the carbon nanotube can improve electrical conductivity by reducing the surface resistance of the product and thus can improve antistatic properties. Specifically, when carbon nanotube aggregates are mixed with the thermoplastic polymer resin, a continuous three-dimensional network can be formed as individual carbon nanotubes are dispersed in the thermoplastic polymer resin and connected to one another, and accordingly, excellent electrical conductivity can be exhibited.

The carbon nanotube of the present invention may include single-walled carbon nanotubes, multi-walled carbon nanotubes, or a combination thereof. Specifically, carbon nanotubes in which the content ratio of the single-walled carbon nanotubes and the multi-walled carbon nanotubes is in the range of 0.1:99.9 to 50:50 may be used, and more specifically, multi-walled carbon nanotubes are preferably used. More specifically, it is preferable to use carbon nanotubes having an average diameter of 5 nm to 20 nm and an aspect ratio of 100 to 10,000 so that degradation of physical properties can be minimized and antistatic properties can be exhibited in the case of kneading with the thermoplastic resin. It is commercially advantageous to use multi-walled carbon nanotubes which are relatively inexpensive and have high purity compared to single-walled carbon nanotubes, which are expensive and have a relatively high impurity content. In addition, compared to single-walled carbon nanotubes, multi-walled carbon nanotubes are less likely to be damaged (e.g., broken) in a composite forming process and retain a longer length after the process, and thus can make a greater contribution to improving the mechanical strength and electrical conductivity of a composite material obtained as a result of the process.

Methods for synthesizing the carbon nanotubes include an arc-discharge method, a pyrolysis method, a laser vaporization method, a plasma chemical vapor deposition method, a thermal chemical vapor deposition method, and the like, but all synthesized carbon nanotubes can be used without limitation to a synthesis method thereof.

According to one embodiment of the present invention, the carbon nanotubes are preferably used in an amount of 1 wt % to 20 wt %, more specifically, 3 wt % to 20 wt %, and when the usage amount is less than 1 wt %, antistatic performance is not well exhibited, and when the usage amount is more than 20 wt %, flowability is lowered, the occurrence of surface defects increases, and desired mechanical properties are not easily obtained.

As the multi-walled carbon nanotubes, bundle-type carbon nanotubes or non-bundle-type carbon nanotubes can be used without limitation.

As used herein, the term "bundle" refers to a bundle or rope form in which a plurality of carbon nanotubes are arranged in parallel or entangled unless otherwise specified. The term "non-bundle or entangled-type" refers to a form that does not have a specific form such as the above-described bundle or rope form.

The bundle-type multi-walled carbon nanotubes may have a form in which a plurality of multi-walled carbon nanotube strands are basically gathered to form a bundle, and the plurality of strands have a linear form, a curved form, or a combination thereof. In addition, the bundle-type carbon nanotubes may also have a linear form, a curved form, or a combination thereof.

According to one embodiment of the present invention, the conductive filler may additionally include a carbon filler and/or carbon black. The content ratio of carbon nanotubes: carbon filler and/or carbon black may be in the range of 3:10 to 3:17.

According to one embodiment of the present invention, the surface of the carbon nanotubes may be treated with sizing a polymer resin sizing agent. Specifically, the sizing agent may be one or more selected from the group consisting of an epoxy-based resin, a phenoxy-based resin, polyurethane, thermoplastic polyurethane (TPU) polyetherimide, polyamide, polypropylene, nitric acid, and maleic anhydride, and more specifically, TPU.

A resin polymer is covalently bonded with the sizing agent, so a strong interfacial bonding force is formed, and since the sizing agent modifies the surface properties of carbon fiber, a polymer polymerized by a separate initiator can also form a better interfacial bond with carbon fiber than before, and the polymerized polymer has the similar chemical structure as the sizing agent and thus is easily bonded to the same.

In this case, the method of applying the sizing agent is not particularly limited, and for example, the sizing agent may be applied by a dipping method, a roll coating method, a die coating method, a gravure coating method, a spray coating method, a flow coating method, or the like, but the present invention is not limited thereto.

Antistatic Resin Composition

An antistatic resin composition according to one embodiment of the present invention may additionally include other additives. The antistatic resin composition may additionally include 0.01 wt % to 10 wt % of a compatibilizer, 0.01 wt % to 10 wt % of an additive, and 0.01 wt % to 60 wt % of rubber, and the other additives may be one or more selected from the group consisting of a compatibilizer, a UV stabilizer, an antioxidant, a lubricant, a heat stabilizer, a rubber, an antibacterial agent, a release agent, a dye, an inorganic additive, a surfactant, a nucleating agent, a coupling agent, a filler, a plasticizer, an impact modifier, an admixture, a colorant, a stabilizer, an antistatic agent, a pigment, and a flame retardant copolymer.

The surface resistance of a specimen prepared by molding the antistatic resin composition according to one embodiment of the present invention may be in the range of $10^2$ ohm/sq to $10^{10}$ ohm/sq, specifically, $10^2$ ohm/sq to $10^4$ ohm/sq, and more specifically, $10^2$ ohm/sq to $10^4$ ohm/sq.

The impact strength of a specimen prepared by molding the antistatic resin composition according to one embodiment of the present invention may be in the range of 30 J/m to 500 J/m, specifically, 50 J/m to 100 J/m.

The tensile strength of a specimen prepared by molding the antistatic resin composition according to one embodiment of the present invention may be in the range of 45 MPa to 100 MPa, specifically, 75 MPa to 95 MPa.

The antistatic resin composition of the present invention can be formed into a molded article through extrusion, injection, or a combination thereof and applied to an antistatic product requiring strength and electrical conductivity, but a method of manufacturing the molded article is not limited to those disclosed above, and a method commonly used in the art can be appropriately used.

Specifically, according to one embodiment of the present invention, the method of manufacturing an antistatic resin composition molded article may include: mixing a thermoplastic resin including a vinyl cyanide compound (A)-conjugated diene compound (B)-aromatic vinyl compound (C) graft copolymer and a conductive filler including carbon nanotubes; manufacturing an antistatic molded article through extrusion, injection, or a combination thereof, wherein the conductive filler is added in an amount of 3 wt % to 20 wt % based on the total weight of the antistatic resin composition, the graft polymer includes 15 wt % to 34 wt % of component (A), 33 wt % to 69 wt % of component (B), and 15 wt % to 34 wt % of component (C), and the content ratio of the sum of components (A) and (C) and component (B) is in the range of 2:1 to 1:2.

Specific examples of the molded article that can be formed by the above method include a battery component, an electronic component transfer cart, an electronic component transfer pipe-coating material, an electronic component for thermoforming, and the like, but the present invention is not limited thereto.

Hereinafter, embodiments of the present invention will be described in detail so that those of ordinary skill in the art to which the present invention pertains can easily carry out the present invention. However, the present invention may be implemented in several different forms and is not limited to the embodiments described herein.

Example 1

97 wt % of an ABS resin and 3 wt % of carbon nanotubes (multi-walled carbon nanotubes) were uniformly mixed so that the total amount was 100 wt %. In the ABS resin, the content ratio of SAN and butadiene was 1:4. To measure various properties, based on the mixed antistatic resin composition, impact test specimens (thickness: 6 mm), tensile strength test specimens (thickness: 3 mm), and surface resistance test specimens (thickness: 3 mm) were prepared using an extruder and an injection machine.

Examples 2 and 3

Specimens were prepared in the same manner as in Example 1 except that SAN and butadiene in ABS resins were mixed in content ratios as shown in Table 1.

Examples 4 and 5

The same procedure as in Example 1 was performed except that 87 wt % of the ABS resin, 3 wt % of carbon nanotubes (multi-walled carbon nanotubes), and 10 wt % of CB or CF were uniformly mixed so that the total amount was 100 wt %.

Examples 6 and 7

The same procedure as in Example 2 was performed except that 82 wt % of the ABS resin, 3 wt % of carbon nanotubes (multi-walled carbon nanotubes), and 15 wt % of CB or CF were uniformly mixed so that the total amount was 100 wt %.

Examples 8 and 9

The same procedure as in Example 3 was performed except that 80 wt % of the ABS resin, 3 wt % of carbon nanotubes (multi-walled carbon nanotubes), and 17 wt % of CB or CF were uniformly mixed so that the total amount was 100 wt %.

Comparative Example 1

97 wt % of an ABS resin and 3 wt % of carbon nanotubes (multi-walled carbon nanotubes) were uniformly mixed so that the total amount was 100 wt %. The content ratio of SAN and butadiene in the ABS resin was 1:5. To measure various properties, based on the mixed antistatic resin composition, impact test specimens (thickness: 6 mm), tensile strength test specimens (thickness: 3 mm), and surface resistance test specimens (thickness: 3 mm) were prepared using an extruder and an injection machine.

Comparative Example 2

The same procedure as in Comparative Example 1 was performed except that SAN and butadiene in the ABS resin were mixed in the content ratio as shown in Table 1.

Comparative Example 3

47 wt % of an ABS resin, 50 wt % of polystyrene (PS), and 3% of carbon nanotubes (multi-walled carbon nanotubes) were uniformly mixed so that the total amount was 100 wt %. The content ratio of SAN and butadiene in the ABS resin was maintained at 1:1 (acrylonitrile:butadiene:styrene=3:5:2). To measure various properties, based on the mixed antistatic resin composition, impact test specimens (thickness: 6 mm), tensile strength test specimens (thickness: 3 mm), and surface resistance test specimens (thickness: 3 mm) were prepared using an extruder and an injection machine.

Comparative Examples 4 and 5

Instead of the polystyrene (PS) used in Comparative Example 3, acrylonitrile was added as shown in Table 1 in Comparative Example 4, butadiene was added in Comparative Example 5, and the remaining procedures were performed in the same manner as in Comparative Example 3.

Comparative Examples 6 and 7

The same procedure as in Comparative Example 1 was performed except that the wt % of the conductive filler of Comparative Example 1 was changed as shown in Table 2.

Comparative Examples 8 and 9

The same procedure as in Comparative Example 2 was performed except that the wt % of the conductive filler of Comparative Example 2 was changed as shown in Table 2.

Experimental Example 1: Measurement of Surface Resistance

The surface resistance of specimens prepared according to Examples 1 to 9 and Comparative Examples 1 to 9 was measured according to the following method. The surface resistance was measured by a four-probe method using a Keithley 6220 current source and a 2182A nanovoltmeter in accordance with ASTM standard D257 under a condition of a composite material thickness of 3 mm. The results of measuring the surface resistance are shown in Table 1 (Examples 1 to 3 and Comparative Examples 1 to 5) and Table 2 (Examples 4 to 9 and Comparative Examples 6 to 9).

Experimental Example 2: Measurement of Impact Strength

The impact strength of specimens prepared according to Examples 1 to 9 and Comparative Examples 1 to 9 was measured according to the following method. After forming a notch on impact test specimens (thickness: 6 mm) using a notching machine, impact strength (J/m) was measured using an Izod impact tester in accordance with ASTM standard D-256. The results of measuring the impact strength are shown in Table 1 (Examples 1 to 3 and Comparative Examples 1 to 5) and Table 2 (Examples 4 to 9 and Comparative Examples 6 to 9).

Experimental Example 3: Measurement of Tensile Strength

The tensile strength of specimens prepared according to Examples 1 to 9 and Comparative Examples 1 to 9 was measured according to the following method. The tensile strength (MPa) of tensile strength test specimens (thickness: 3 mm) was measured in accordance with ASTM standard D638 using a universal testing machine (UTM). The results of measuring the tensile strength are shown in Table 1 (Examples 1 to 3 and Comparative Examples 1 to 5) and Table 2 (Examples 4 to 9 and Comparative Examples 6 to 9).

Experimental Example 4: Measurement of MI

The MI of the compositions of Examples 1 to 9 and Comparative Examples 1 to 9 was measured in accordance with ASTM standard D1238 using a melt flow index (g/10 min) tester. The results of measuring the MI are shown in Table 1 (Examples 1 to 3 and Comparative Examples 1 to 5) and Table 2 (Examples 4 to 9 and Comparative Examples 6 to 9).

Experimental Example 5: Measurement of PDI

The PDI of ABS in the compositions of Examples 1 to 9 and Comparative Examples 1 to 9 was determined by gel permeation chromatography (GPC). The results of measuring the PDI are shown in Table 1 (Examples 1 to 3 and Comparative Examples 1 to 5) and Table 2 (Examples 4 to 9 and Comparative Examples 6 to 9).

TABLE 1

| | | | ABS | | | | Properties | | | | |
| | | | mixing ratio | | | Conductive filler | Surface resistance | Impact strength | Tensile strength | MI (g/10 | |
| Classification | ABS | Additional component | A | B | S | CNT | (ohm/sq) | (J/m) | (MPa) | min) | PDI |
|---|---|---|---|---|---|---|---|---|---|---|---|
| Example 1 | 97 | 0 | 1 | 8 | 1 | 3 | $10^3$ | 89 | 78 | 25 | 2.1 |
| Example 2 | 97 | 0 | 1 | 2 | 1 | 3 | $10^3$ | 76 | 86 | 30 | 1.82 |
| Example 3 | 97 | 0 | 2 | 1 | 2 | 3 | $10^4$ | 53 | 94 | 40 | 2.1 |
| Comparative Example 1 | 97 | 0 | 1 | 10 | 1 | 3 | $10^6$ | 53 | 30 | 75 | 6.9 |
| Comparative Example 2 | 97 | 0 | 5 | 2 | 5 | 3 | $10^5$ | 28 | 81 | 0.5 | 5.1 |
| Comparative Example 3 | 47 | 50 | 3 | 5 | 2 | 3 | $10^5$ | 30 | 70 | 0.6 | 8.3 |
| Comparative Example 4 | 47 | 50 | 3 | 5 | 2 | 3 | $10^6$ | 35 | 75 | 0.7 | 7.5 |
| Comparative Example 5 | 47 | 50 | 3 | 5 | 2 | 3 | $10^5$ | 68 | 35 | 105 | 8.5 |

In the above Table 1, it can be seen that the resin compositions obtained according to Examples 1 to 3 have excellent electrical properties and excellent mechanical properties including impact strength and tensile strength. In the case of Comparative Examples 3 to 5, the ratio of SAN and B is not within the range of 4:1 to 1:4, and in this case, it can be seen that electrical properties are degraded and mechanical properties are also significantly degraded.

TABLE 2

| | ABS | | | | Conductive filler | | | Properties | | | | |
| | ABS | mixing ratio | | | | | | Surface resistance | Impact strength | Tensile strength | MI (g/10 | |
| Classification | (wt %) | A | B | S | CNT | CB | CF | (ohm/sq) | (J/m) | (MPa) | min) | PDI |
|---|---|---|---|---|---|---|---|---|---|---|---|---|
| Example 4 | 87 | 1 | 8 | 1 | 3 | 10 | | $10^3$ | 91 | 75 | 22 | 2.1 |
| Example 5 | 87 | 1 | 8 | 1 | 3 | | 10 | $10^3$ | 98 | 78 | 26 | 1.7 |
| Example 6 | 82 | 1 | 2 | 1 | 3 | 15 | | $10^2$ | 78 | 88 | 32 | 1.9 |
| Example 7 | 82 | 1 | 2 | 1 | 3 | | 15 | $10^2$ | 80 | 83 | 34 | 1.5 |
| Example 8 | 80 | 2 | 1 | 2 | 3 | 17 | | $10^3$ | 65 | 90 | 45 | 2.3 |
| Example 9 | 80 | 2 | 1 | 2 | 3 | | 17 | $10^3$ | 73 | 92 | 43 | 1.75 |
| Comparative Example 6 | 70 | 1 | 10 | 1 | 10 | 20 | | $10^3$ | 5 | 10 | 0.8 | 6.1 |
| Comparative Example 7 | 70 | 1 | 10 | 1 | 10 | | 20 | $10^3$ | 7 | 10 | 0.5 | 5.4 |
| Comparative Example 8 | 47 | 3 | 1 | 3 | 10 | 30 | | $10^2$ | 3 | 20 | 0.2 | 6.5 |
| Comparative Example 9 | 47 | 3 | 1 | 3 | 10 | | 30 | $10^2$ | 3 | 20 | 0.3 | 5.9 |

In the above Table 2, it can be seen that the resin compositions obtained according to Examples 4 to 9 have excellent electrical properties and excellent mechanical properties including impact strength and tensile strength. On the other hand, in the case of Comparative Examples 6 to 9, the ratio of SAN and B is not within the range of 4:1 to 1:4, and the content of conductive fillers is not within the range of 13 wt % to 20 wt %. In the case of Comparative Examples 6 to 9, it can be seen that electrical properties are excellent, but mechanical properties are significantly degraded.

As described above in detail a specific part of the content of the present invention, for those of ordinary skill in the art, it is clear that this specific description is only a preferred embodiment, and the scope of the present invention is not limited thereby. Accordingly, the substantial scope of the present invention will be defined by the appended claims and their equivalents.

What is claimed is:

1. An antistatic resin composition comprising:
a thermoplastic resin including a vinyl cyanide compound-conjugated diene compound-aromatic vinyl compound graft copolymer; and
a conductive filler including carbon nanotubes, wherein the conductive filler is added in an amount of 1 wt % to 20 wt % based on the total weight of the composition,
wherein the vinyl cyanide compound-conjugated diene compound-aromatic vinyl compound graft copolymer includes components (A) vinyl cyanide compound, (B) conjugated diene compound, (C) aromatic vinyl compound having the following weight-average molecular weights (Mw):
component (A): Mw=45,000 g/mol to 55,000 g/mol,
component (B): Mw=50,000 g/mol to 60,000 g/mol,
component (C): Mw=25,000 g/mol to 35,000 g/mol.

2. The antistatic resin composition of claim 1, wherein the vinyl cyanide compound-conjugated diene compound-aromatic vinyl compound graft copolymer has a weight-average molecular weight (Mw) of 120,000 g/mol to 150,000 g/mol.

3. The antistatic resin composition of claim 1, wherein the vinyl cyanide compound-conjugated diene compound-aromatic vinyl compound graft copolymer has a polydispersity index (PDI) of 1 to 3.

4. The antistatic resin composition of claim 1, wherein the vinyl cyanide compound-conjugated diene compound-aromatic vinyl compound graft copolymer includes:
9 wt % to 44 wt % of the component (A);
17 wt % to 79 wt % of the component (B); and
9 wt % to 44 wt % of the component (C), wherein a content ratio of the sum of the components (A) and (C) and the component (B) is in the range of 4:1 to 1:4.

5. The antistatic resin composition of claim 1, wherein the conductive filler includes further one or more of a carbon filler and carbon black, and a content ratio of the carbon nanotubes and the one or more of a carbon filler and carbon black is in the range of 3:10 to 3:17 by weight.

6. The antistatic resin composition of claim 1, wherein a surface of the carbon nanotubes is treated with sizing thermoplastic polyurethane.

7. The antistatic resin composition of claim 1, wherein the thermoplastic resin has a melt flow index (MI) of 10 g/10 min to 50 g/10 min.

8. The antistatic resin composition of claim 1, wherein the thermoplastic resin further includes one or more selected from the group consisting of polyester, polystyrene, polypropylene, polyimide, polyamide, polysulfonate, polycarbonate, polyacrylate, polyvinyl acetal, polymethylmethacrylate, polyvinyl chloride, polyethylene, modified polyphenylene oxide, SBS, SAN, synthetic rubber, a phenolic resin, an epoxy resin, an acrylic resin, a blend thereof, and a copolymer thereof.

9. The antistatic resin composition of claim 1, wherein the composition additionally includes one or more additives selected from the group consisting of a compatibilizer, a UV stabilizer, an antioxidant, a lubricant, a heat stabilizer, a rubber, an antibacterial agent, a release agent, a dye, an inorganic additive, a surfactant, a nucleating agent, a coupling agent, a filler, a plasticizer, an impact modifier, an admixture, a colorant, a stabilizer, an antistatic agent, a pigment, and a flame retardant.

10. The antistatic resin composition of claim 1, wherein the surface resistance of a specimen prepared by molding the antistatic resin composition is in the range of $10^2$ ohm/sq to $10^4$ ohm/sq.

11. The antistatic resin composition of claim 1, wherein the impact strength of a specimen prepared by molding the antistatic resin composition is in the range of 50 J/m to 100 J/m.

12. An antistatic molded article manufactured and obtained by subjecting the antistatic resin composition of claim 1 to an extrusion process, an injection process, or a combination thereof.

13. The antistatic molded article of claim 12, wherein the molded article is a battery component, an electronic component transfer cart, an electronic component packaging material, or an electronic component transfer tray.

14. A method of manufacturing an antistatic molded article, comprising:
preparing the antistatic resin composition of claim 1; and
manufacturing an antistatic molded article by subjecting the antistatic resin composition to an extrusion process, an injection process, or a combination thereof.

* * * * *